US005321980A

United States Patent [19]

Hering et al.

[11] Patent Number: 5,321,980

[45] Date of Patent: Jun. 21, 1994

[54] INTEGRATED THROTTLE POSITION SENSOR WITH INDEPENDENT POSITION VALIDATION SENSOR

[75] Inventors: Charles A. Hering, Portland, Oreg.; David A. Schaller, Fort Wayne, Ind.

[73] Assignee: Williams Controls, Inc., Portland, Oreg.

[21] Appl. No.: 901,554

[22] Filed: Jun. 19, 1992

Related U.S. Application Data

[63] Continuation-in-part of Ser. No. 698,671, May 10, 1991, Pat. No. 5,133,321.

[51] Int. Cl.[5] ............ G01M 19/00

[52] U.S. Cl. ............ 73/118.1; 123/361

[58] Field of Search ............ 73/118.1; 123/399, 361

[56] References Cited

U.S. PATENT DOCUMENTS

| | | | |
|---|---|---|---|
| 3,692,007 | 9/1972 | Nilssen | 123/399 |
| 4,603,675 | 8/1986 | Junginger et al. | 123/478 |
| 4,920,939 | 5/1990 | Gale | 123/399 |
| 4,922,177 | 5/1990 | Mausner | 123/399 X |
| 4,958,607 | 9/1990 | Lundberg | 123/399 |
| 5,048,481 | 9/1991 | Chan et al. | 73/118.1 X |
| 5,150,681 | 9/1992 | Kull et al. | 73/118.1 X |

FOREIGN PATENT DOCUMENTS

WO9007054 6/1990 World Int. Prop. O. .

*Primary Examiner*—Hezron E. Williams
*Assistant Examiner*—Mort Smith
*Attorney, Agent, or Firm*—Robert L. Harrington

[57] ABSTRACT

An integrated throttle position validation sensor includes electrically independent throttle position and position validation components responsive to a single mechanical input applied to a protective sensor housing. By suitable mounting to the throttle control device, the mechanical input corresponds to accelerator pedal position. Within the sensor housing a potentiometer moves with the mechanical input whereby a variable voltage throttle position signal is generated. Also, within the housing a separate validation switch responsive to the mechanical input provides an independent representation of throttle control device position in the form of, for example, a bi-state validation signal. The sensor integrates previous separate throttle control position and position validation functions into a single environmentally secure housing which requires no calibration. The integrated sensor is more reliable and less costly than previously available separate throttle control and idle validation functions.

12 Claims, 4 Drawing Sheets

INTEGRATED THROTTLE POSITION SENSOR WITH INDEPENDENT POSITION VALIDATION SENSOR

RELATED APPLICATIONS

The present application is a continuation-in-part of pending and allowed U.S. patent application Ser. No. 698,671 filed May 10, 1991 by applicants herein and entitled INTEGRATED THROTTLE CONTROL AND IDLE VALIDATION SENSOR now U.S. Pat. No. 5,133,321.

BACKGROUND OF THE INVENTION

The present invention applies to engine control systems and particularly to throttle control systems.

Many vehicle throttle control systems now use electrical circuitry to deliver an electrical signal from the accelerator or throttle control device, e.g., an accelerator pedal or hand control lever, to an electronic control system, e.g., fuel delivery system. For example, a voltage signal provided to the electronic fuel control system corresponds to accelerator pedal or hand control position. When an "in-range" voltage level arrives at the electronic fuel control system, the electronic fuel control system responds by injecting a corresponding volume of fuel into the engine fuel system.

In some applications, an accelerator control device failure can result in an invalid in-range throttle condition, i.e., an unintended in-range voltage level. Under such condition, even though the accelerator control device is at, for example, an idle position, the electronic fuel control system receives an erroneous throttle control signal and undesirably injects fuel into the engine fuel system. Loss of engine throttle control, and possibly unintended vehicle acceleration, can result.

To avoid such an error condition, a separate idle validation switch has been added to the accelerator control device as backup protection against such a failure. For example, U.S. Pat. No. 4,958,607 issued Sep. 25, 1990 to Lundberg and entitled Foot Pedal Arrangement For Electronic Throttle Control Of Truck Engines shows a throttle control arrangement in FIG. 1 including separately mounted a micro-switch responsive to a given position of the pedal for delivery of a idle validation signal to a computer controlling engine throttle functions. Typically, this switch provides a function wherein one side of the switch delivers a logic signal corresponding to valid idle operation and the other side validates throttle active operation. The switch slidably mounts to the accelerator control device in such a way that actuation of the accelerator control changes the switch position from its idle validation position to its throttle validation position according to a given, and often very precise, calibration. The electronic fuel control system ignores the throttle control signal until it receives a throttle validation signal by way of the switch.

Accordingly, if an erroneous in-range throttle signal arrives at the electronic fuel control system, unintended fuel delivery is avoided because the electronic fuel control system has not yet received a throttle validation signal.

The idle validation switch attaches to the accelerator pedal or hand control as a separate component. The switch slidably and separately mounts to the accelerator control device in such manner to provide the switching point at a particular pedal or hand control lever position. It is necessary to adjust or calibrate the point at which the switching occurs to coincide with a specified throttle signal level, i.e., a point of transition between idle and throttle operation. This insures that the switch is in the idle valid mode when the driver releases the accelerator control device, and that the engine will have a smooth idle to power transition when the driver applies the throttle. Switch transition points are typically specified by the engine manufacturer.

Installation of the separate idle validation switch can be difficult because of the sensitive calibration required to meet the engine manufacturer's specifications, and the complex test procedures needed to insure that proper switch functioning occurs. Additionally, the switch must meet stringent environmental quality standards to function reliably in typical operating environments.

The calibration requirements of the separately mounted idle validation switch of Lundberg can expose a trucking concern to potentially thousands of dollars in costs in the event of switch failure. Consider a situation where a truck driver encounters a failure of such throttle equipment while in route. The truck driver would likely tow the truck to an authorized repair service and not only obtain the parts necessary to replace the pedal assembly, but also employ a qualified repair person to accomplish the necessary calibration between the separate idle validation switch and the throttle position sensor. As may be appreciated, the time and money lost in accomplishing such repairs can be significant.

These factors result in an expensive throttle control with validation switch and, in some cases, marginal product reliability. The resulting product is also virtually impossible to service in the field without extensive expert calibration. In some cases the entire accelerator control assembly is necessarily replaced. Such difficult field service further adds to the overall cost of such throttle validation systems.

SUMMARY OF THE INVENTION

The present invention provides an integrated throttle sensor responsive to operator actuation of an accelerator control device and providing at least two output signals, one output signal being representative of a throttle position and the second output signal validating a given throttle position or throttle position within a given range. The sensor of the preferred embodiment of the present invention includes a mechanical input responsive to the accelerator control and provides as electrical outputs sufficient information to determine the position of the accelerator control and separately validate a given position for the throttle control.

In accordance with a preferred first illustrated embodiment of the present invention as applied to idle validation, an accelerator position sensor is combined in an integrated sensor package with mechanical registration of the idle validation switch and throttle control sensor built into the sensor. The accelerator position sensor and idle validation switch are electrically separate units, but mechanically coupled for response to a common actuation mechanism. The common mechanical connection establishes and maintains constant the required mechanical registration. The resulting integrated sensor can be installed on the control device without significant adjustment, i.e., without calibration of the switch and sensor. Also, packaging of the idle validation switch in the sensor housing protects the switch from its environment and thereby increases its reliability. The integrated package thereby enjoys reduced number of parts, increased reliability and serviceability, and reduced overall cost.

In other illustrations of the present invention, a throttle sensor responsive to operator positioning of the accelerator control may provide additional position validation signals. For example, transmission kickdown, e.g., passing gear, may be initiated when the throttle has been driven to a fully open position and the validation signal independently validates the fully open throttle. A retarder enable function is possible under the present invention when the validation signal corresponds to operator release of the accelerator control and actuates an auxiliary breaking device to aid in retarding movement of a heavy vehicle such as on a steep grade. The present invention may be applied to transmission control such as for determining a time for shifting between gears in an automatic transmission control system based on the direction of movement for the accelerator control as independently verified by a position validation signal of the present invention. Many other enhancements to vehicle control systems are also possible by suitable use of the independent position validation signal provided under the present invention.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
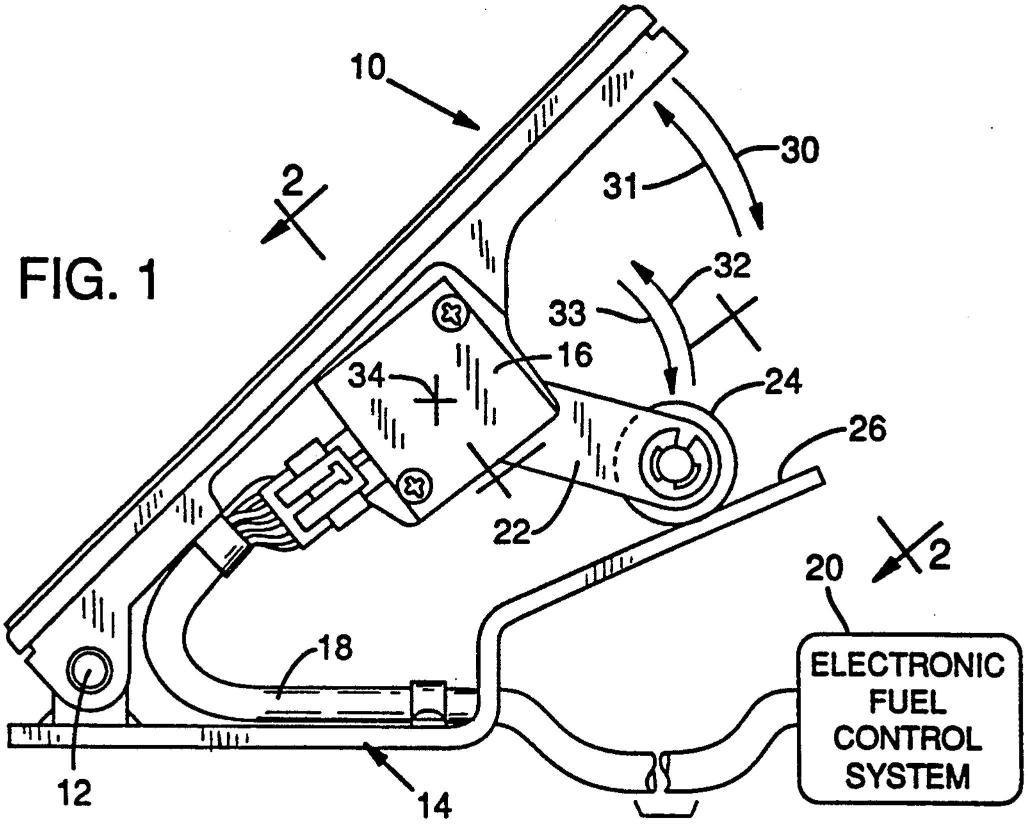
FIG. 1 is a side view of an accelerator pedal, an integrated throttle control and idle validation sensor, and an electronic fuel control system.

FIG. 1 shows a throttle control device, i.e., an accelerator pedal 10, pivotally coupled at pin 12 to a base plate 14. Base plate 14 attaches to the floor of a vehicle (not shown) in conventional manner. An integrated throttle control and idle validation sensor 16 mounts to the underside of pedal 10 for the combined functions of providing a throttle control signal, an idle validation signal, and a throttle validation signal. Sensor 16 couples by way of multi-conductor cable 18 to an electronic fuel control system 20. System 20 is a conventional control system, and in the illustrated embodiment corresponds to a Cummins electronic fuel control system available under the trade name CELECT. While illustrated with reference to a specific electronic fuel control system, it will be appreciated by those skilled in the art that sensor 16 may be adapted to operate with a wide variety of engine control systems and control devices.

A lever arm 22 pivotally mounts to sensor 16 and carries a roller 24 at its distal end. Base plate 14 includes an inclined surface 26 engaged by roller 24. As the operator depresses pedal 10 to accelerate the vehicle, pedal 10 rotates about pin 12 in the direction 30, clockwise in the view of FIG. 1. As roller 24 moves upward along surface 26 in response to downward actuation of pedal 10, lever arm 22 pivots in the direction 32, counter clockwise in the view of FIG. 1, about the axis 34. Sensor 16 detects such movement of lever arm 22 and delivers to system 20 by way of cable 18 suitable signals separately indicating and independently validating the position of pedal 10.

Figure 2:
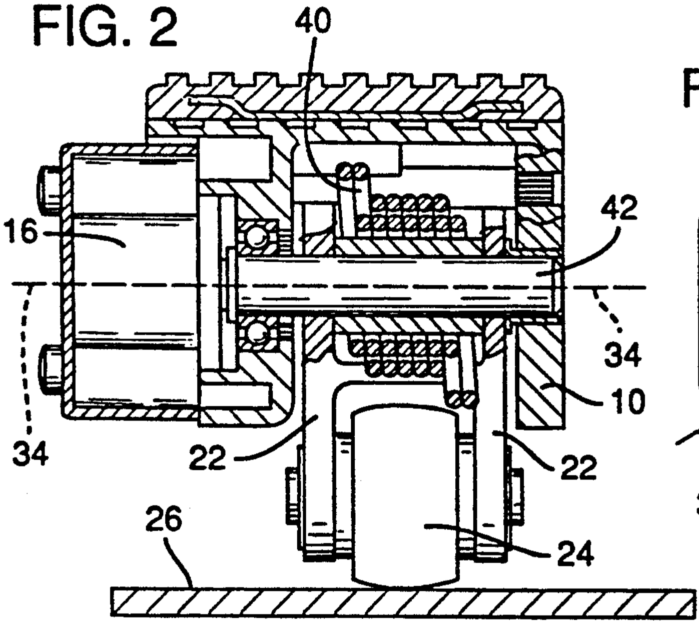
FIG. 2 is a sectional view of the pedal and sensor of FIG. 1 taken along lines 2—2 of FIG. 1.

FIG. 2 shows a sectional view of the assembly of FIG. 1 taken through the sensor 16 and arm 22. In FIG. 2, a double spring 40 encircles a shaft 42 mounted upon the body of pedal 10 for rotation about the axis 34. Spring 40 couples the underside of pedal 10 and lever arm 22 to bias lever arm 22 in the direction 33 opposite that of direction 32. Pedal 10 is thereby spring biased in the direction 31, opposite of direction 30, and toward the idle position as shown in FIG. 1. The shaft 42, pivotally mounts to the body of pedal 10, but fixedly attaches to lever arm 22 such that movement of pedal 10 results in rotation of shaft 42 relative to sensor 16 and about the axis 34. Sensor 16, being mechanically coupled to shaft 42, responds to rotation of shaft 42 by producing the desired throttle control, idle validation, and throttle validation signals according to pedal 10 position as described hereinafter.

Figure 3:
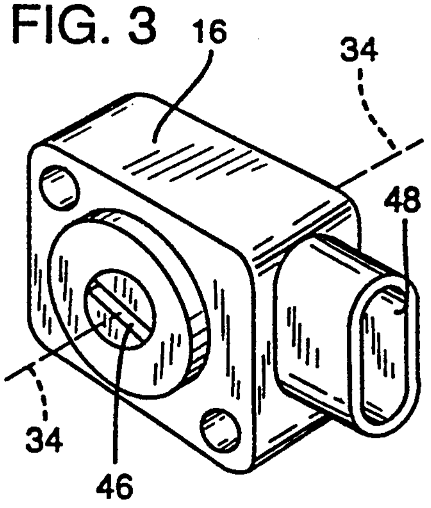
FIG. 3 is a perspective view of the integrated throttle control and idle validation sensor of FIG. 1.

FIG. 3 shows in perspective the throttle control and idle validation sensor 16. Sensor 16 includes a slot formation 46 for mechanical coupling to shaft 42 and an electrical connector formation 48 for electrical coupling to multi-conductor cable 18. Shaft 42 engages slot formation 46 and rotates slot formation 46 about the axis 34 as a mechanical input to sensor 16. Movement of pedal 10 about pin 12 results in mechanical input, by way of shaft 42, to sensor 16 at slot formation 46. In response, sensor 16 generates the necessary signals at the connector formation 48 for delivery by way of cable 18 to electronic fuel control system 20. It will, therefore, be appreciated by those skilled in the art that sensor 16 provides an integrated package receiving a mechanical input and delivering suitable electrical outputs. Sensor 16 requires no calibration for idle validation relative to throttle control as such calibration is built into the integrated package at the time of manufacture. Also, by enclosing the throttle control and idle validation functions in the housing of sensor 16, the risk of exposure to environmental conditions, possibly effecting operation of sensor 16, is substantially eliminated.

Figure 4:
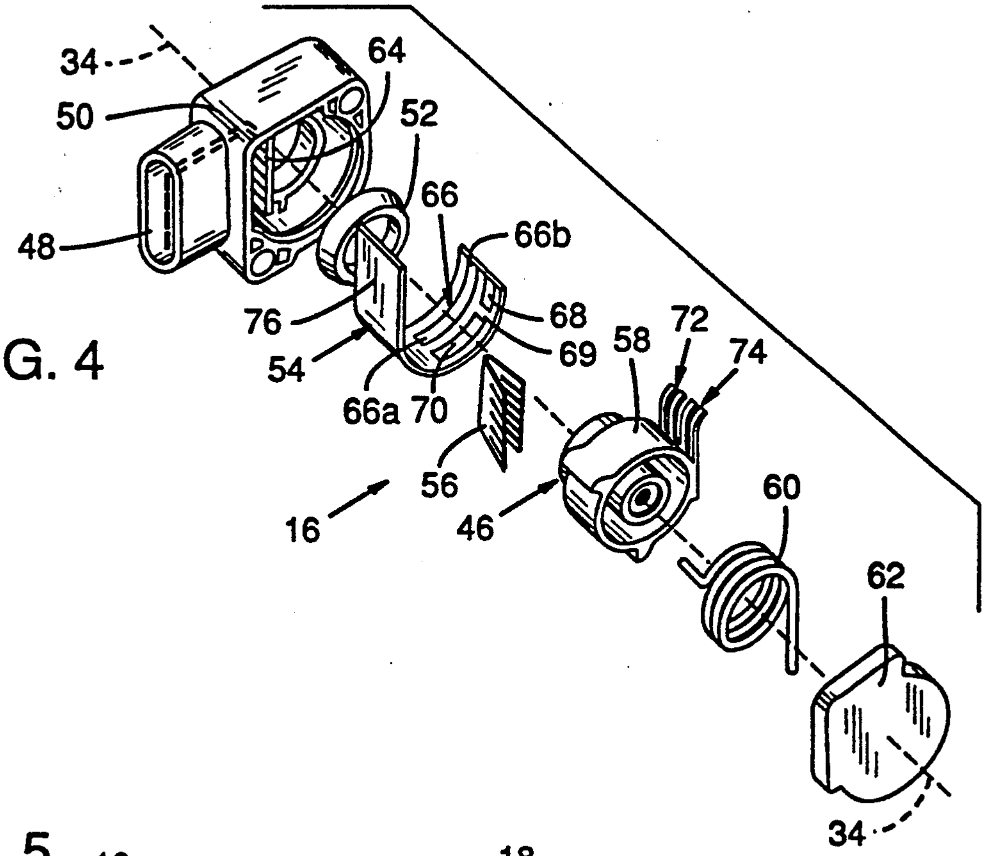
FIG. 4 is an exploded view of the sensor of FIG. 3.

FIG. 4 is a view of sensor 16 exploded along the axis 34. In FIG. 4, sensor 16 comprises an external housing 50, a seal 52, a screened film element 54, a termination wedge 56, a rotor 58, a spring 60, and a cover 62. Within housing 50, a terminal structure 64 carries conductive elements, corresponding to those of cable 18, from within the connector formation 48 to the interior of housing 50. As described more fully below, the screened film element 54 includes a resistive element 66, an idle conductive element 68, and a throttle conductive element 70 suitably etched onto the substrate of film element 54. The rotor 58 includes a throttle wiper 72 and an idle/throttle validation wiper 74. In assembly of sensor 16, seal 52 first inserts within housing 50, then film element 54 rests within housing 50 such that elements 66, 68, and 70 of film element 54 face inward. A flat portion 76 of screened film element 54 rests adjacent the terminal structure 64. Film element 54 includes additional conductive traces (not shown) for coupling elements 66, 68, and 70 to suitable terminal contact points (not shown) of flat portion 76. The termination wedge 56 suitably interconnects the elements 66, 68, and 70 of element 54, by way of the terminal contacts (not shown) of flat portion 76, with the conductors of terminal structure 64. Electrical coupling between individual conductors of cable 18 and portions of film element 54 is thereby established.

Rotor 58 inserts within housing 50 interior of film element 54 and the wipers 72 and 74 contact portions of film element 54. More particularly, the throttle wiper 72 contacts the resistive element 66 of film element 64 and the idle/throttle validation wiper 74 selectively contacts one of, or neither of, the idle conductive element 68 and the throttle conductive element 70. Seal 52 seals rotor 58 within housing 50 while allowing rotation about the axis 14. Spring 60 couples rotor 58 and housing 50 to suitably bias rotor 58 toward a full return position. Cover 62 attaches to housing 50 to rotatably support rotor 58 and to seal the entire assembly. Rotor 58 includes the slot formation 46 (not shown but indicated by numeral 46 in FIG. 4). Rotor 58 then rotates within housing 50 and about the axis 34 according to rotation of shaft 42, i.e., in response to operator actuation of pedal 10. Throttle wiper 72 thereby moves along resistive element 66 while, for given ranges of angular position for rotor 58, validation wiper 74 contacts one of the idle validation conductive element 68, a non-conductive portion 69, or idle validation conductive element 70.

Figure 5:
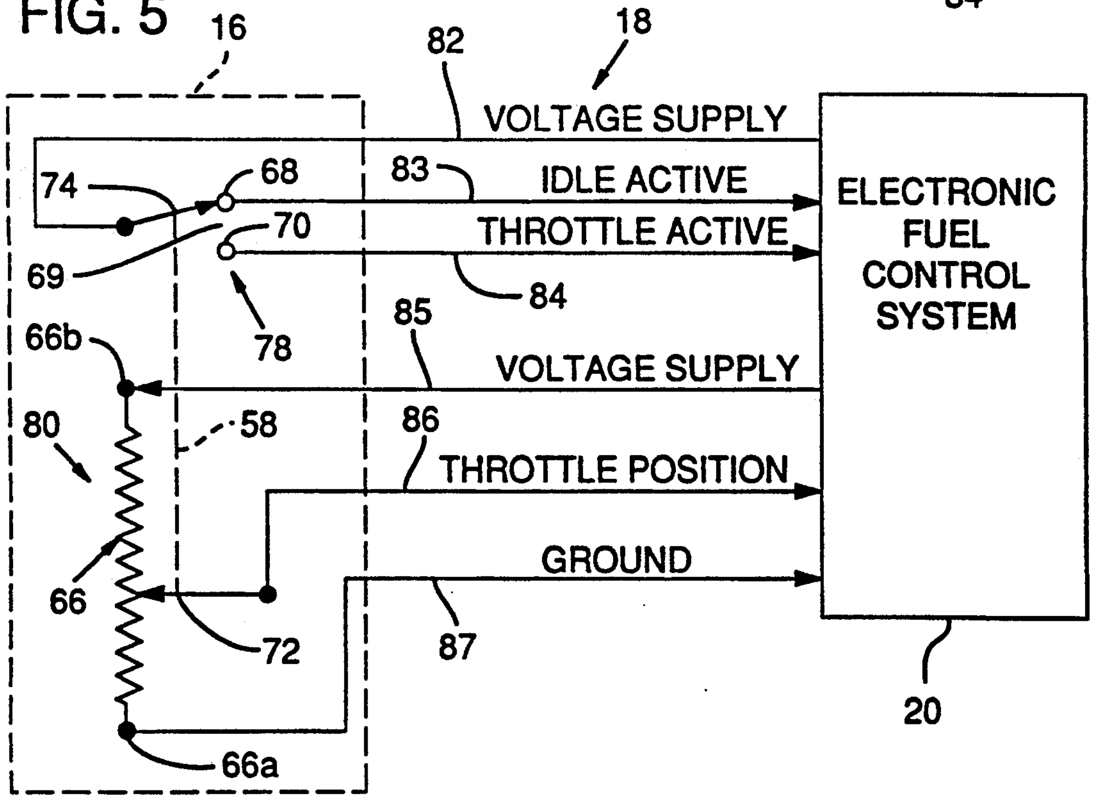
FIG. 5 is a schematic diagram of the sensor and electronic fuel control system showing electronic coupling.

FIG. 5 illustrates electrical connections between portions of the sensor 16 and the electronic fuel control system 20 as established by the conductors of cable 18. In FIG. 5, the validation wiper 74 together with conductive elements 68 and 70 and nonconductive portion 69 comprise a switch 78. The resistive element 66 and throttle wiper 72 comprise a potentiometer 80. Switch 78 and potentiometer 80 are mechanically coupled by way of rotor 58, but are electrically separate. A voltage supply conductor 82 of cable 18 connects, by way of structure 64, wedge 56, and conductive traces of film element 54, to wiper 74, i.e., to the common pole of switch 78. An idle active conductor 83 of cable 18 couples in similar manner to idle conductive element 68. A throttle active conductor 84 of cable 18 similarly couples to throttle conductive element 70. Switch 74 selectively routes the supply voltage present on conductor 82 to neither or to one of cable conductors 83 and 84 for interpretation by electronic fuel control system 20. A supply voltage potential on idle active conductor 83 validates an idle position for pedal 10 while a supply voltage potential on throttle active conductor 84 validates an in-range throttle control signal. A supply voltage on neither of conductors 83 and 84, i.e., an open connection, indicates to system 20 a transition between an idle active and a throttle active condition of pedal 10.

A second voltage supply conductor 85 of cable 18 delivers a supply voltage to end 66*b* of resistive element 66 while a ground conductor 87 of cable 18 connects to the opposite end 66*a* of resistive element 66 as a ground return to electronic fuel control system 20. A throttle position conductor 86 of cable 18 couples to wiper 72 of potentiometer 80 whereby the voltage potential on throttle position conductor 86 corresponds to the position of wiper 72, more particularly, to the position of pedal 10.

As noted above, the switch 78 and potentiometer 80 are mechanically coupled by way of rotor 58. As rotor 58 moves from its full return position through a given range of angular movement, corresponding to full actuation of pedal 10, wiper 72 moves from near end 66*b* toward end 66*a* of resistive element 66. Concurrently with such rotation of rotor 58, wiper 74 initially contacts conductive element 68, but as rotor 58 moves through a given angular transition zone range, it disengages conductive element 68 as it rests against nonconductive portion 69. At the end of this transition zone range, wiper 74 contacts conductive element 70. Thus, rotation of rotor 58 through its angular range of motion corresponds to a continuously variable voltage signal on throttle position conductor 86, and suitable presentation of discrete bi-state logic validation signals on idle active conductor 83 and throttle active conductor 84.

In the preferred embodiment, rotor 58 has a full range of approximately 70 degrees of rotation corresponding to movement of pedal 10 from idle to full acceleration. The transition zone range, between idle validation and throttle validation, is determined by the extent of nonconductive portion 69 of film element 54 separating conductive elements 68 and 70. As will be apparent to those skilled in the art, a variety of configurations for sensor 16 will yield a variety of rotor 58 movement ranges and transition zone ranges as desired.

Figure 6:
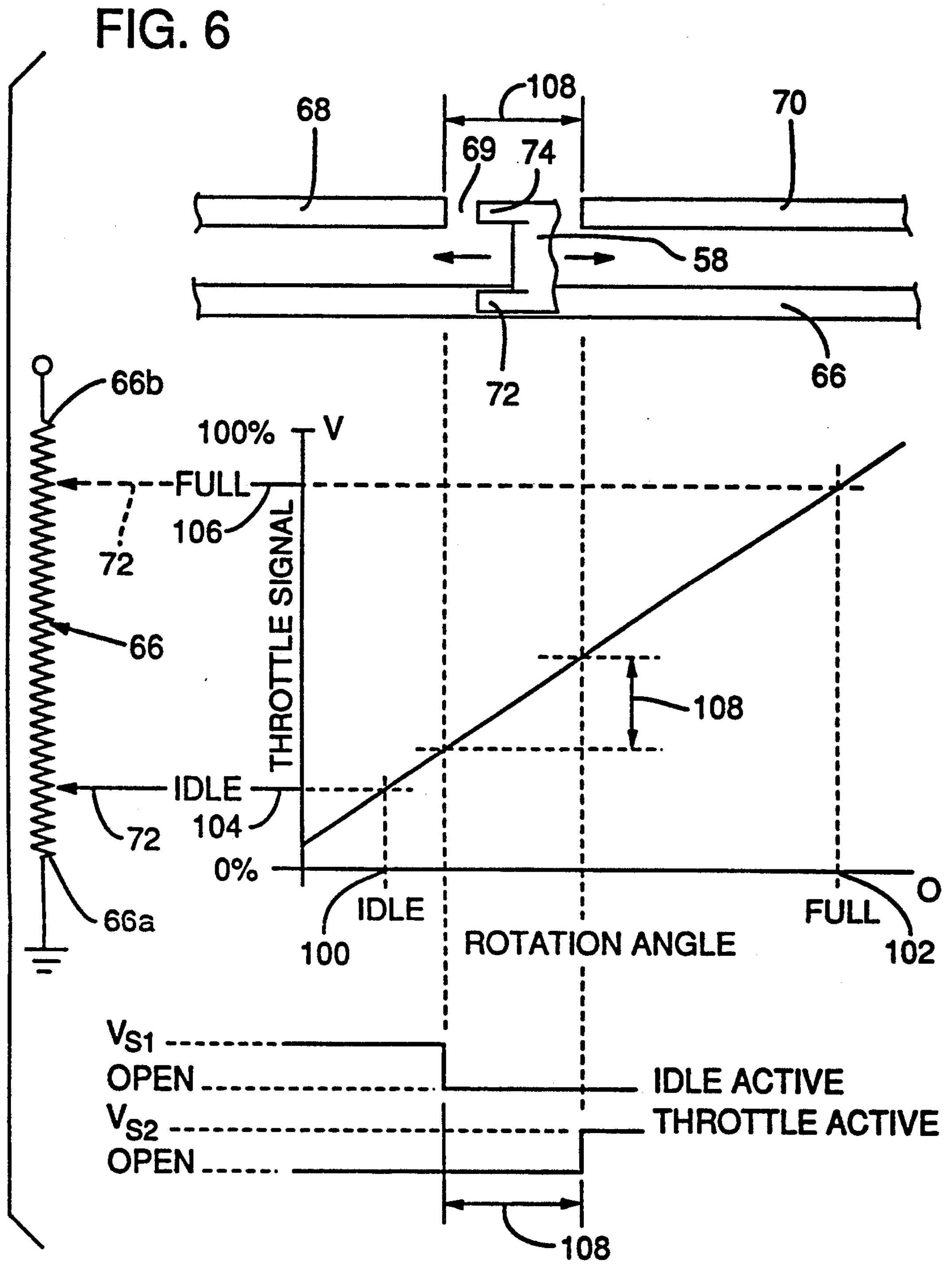
FIG. 6 illustrates the relationship between mechanical operation of the sensor and production of the throttle control signal, idle validation signal and throttle validation signal.

FIG. 6 relates the wiper 72 position in terms of a rotation angle of rotor 58 on the horizontal axis to the throttle control signal voltage, on the vertical axis, delivered to electronic fuel control system 20 by way of conductor 86. As the angular position of rotor 58 moves from an idle position 100 to a full throttle position 102, the voltage at wiper 72 ramps linearly from an idle voltage 104 to a full throttle voltage 106. The wiper 74 similarly moves from contact with idle conductive element 68 through a transition zone 108 and on to contact with throttle conductive element 70. Thus, as rotor 58 moves from its idle position 100 to its full throttle position 102, the voltage on conductor 83 of cable 18, representing an idle active signal, remains at the supply voltage $V_{s1}$ until wiper 74 loses contact with conductive element 68. At this time the idle active conductor 83 of cable 18 presents an open circuit to system 20. Continuing with rotation of rotor 58 toward the full throttle position 102, wiper 74 eventually contacts conductive element 70 whereat the voltage on conductor 84 of cable 18, representing a throttle active signal, moves from being open to the supply voltage potential $V_{s2}$.

Electronic fuel control system 20 monitors the throttle position conductor 86, idle active conductor 83 and throttle active conductor 84 of cable 18. A supply voltage potential on idle active conductor 83 validates the idle position for pedal 10 and system 20 ignores the signal on throttle position conductor 86. A supply voltage potential on throttle active conductor 84 validates an in-range throttle control signal on throttle position conductor 86 and an appropriate volume of fuel is delivered to the vehicle engine. An open circuit on both of conductors 83 and 84 indicates to system 20 a throttle transition between an idle condition and a throttle condition. System 20 reacts as programmed according to the necessary engine specification requirements for transition between idle and throttle.

Figure 7:
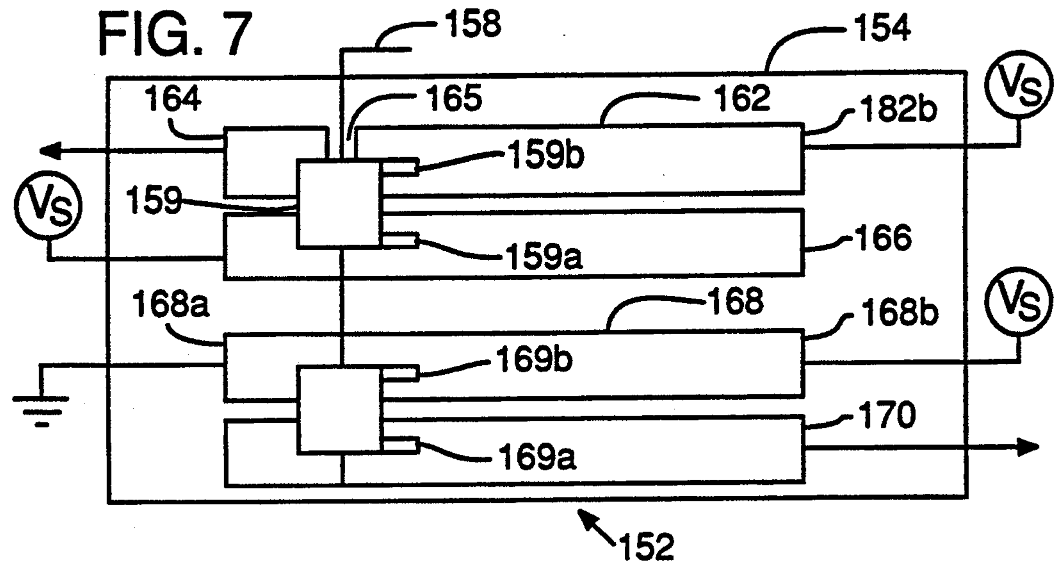
FIGS. 7-9 illustrate schematically alternative embodiments of the present invention.
Figure 8:
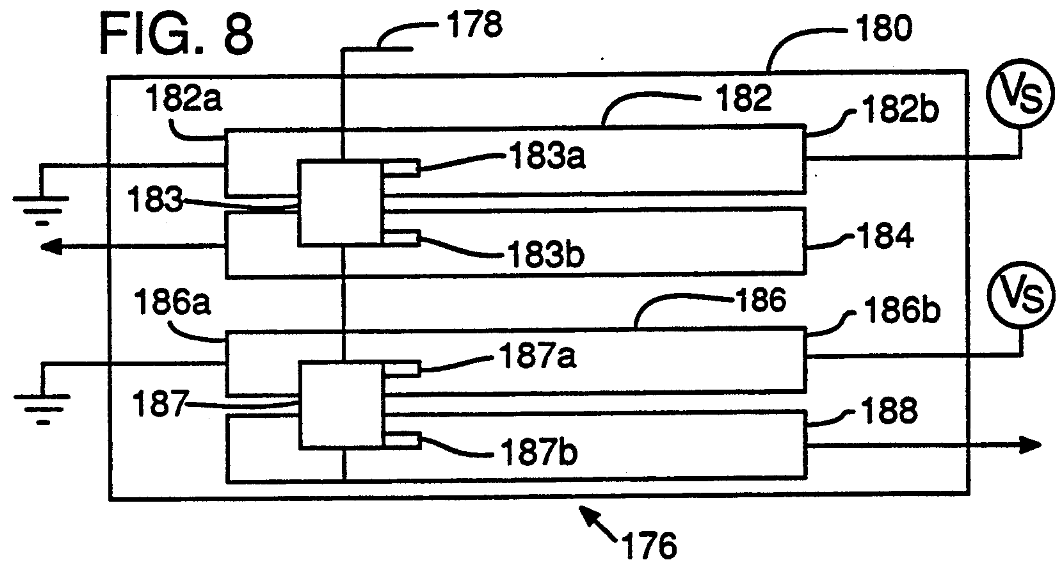
Figure 9:
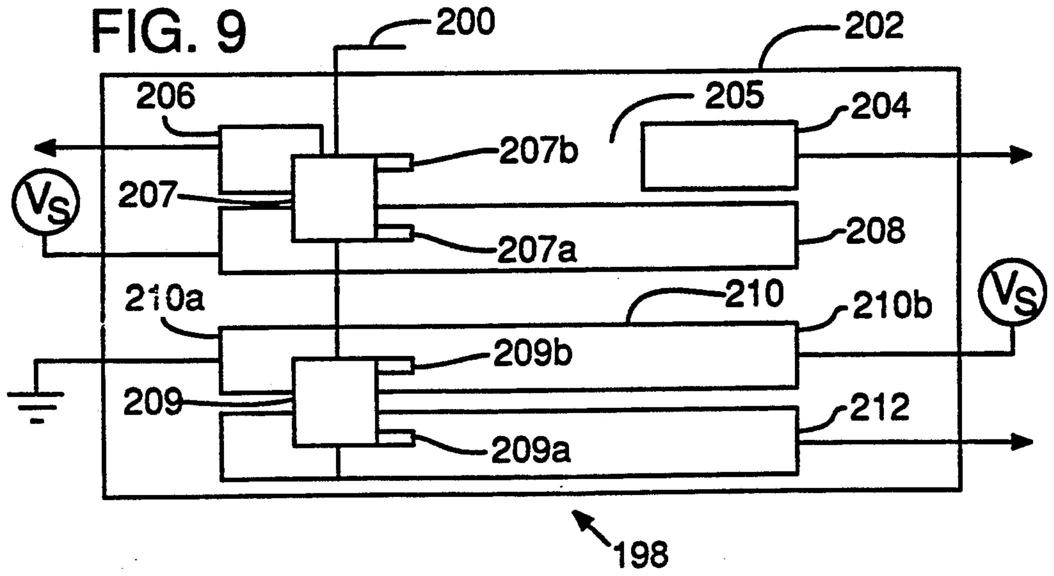

FIGS. 7-9 show alternative embodiments of the present invention. In the illustration of FIGS. 7-9, the integrated sensor arrangement is shown schematically as including a screened film element carrying conductive portions and resistive elements similar to that of screened film element 54 described above. A rotor, similar to rotor 58 above, reacts to the mechanical input and carries wipers for engagement of the various conductive portions and resistive elements of the screened film element. It will be understood, therefore, that while illustrated schematically in FIGS. 7-9, these embodiments of the present invention may be implemented in the manner of the above described embodiment in a common housing and responsive to a common mechanical input.

FIG. 7 illustrates a complimentary idle validation switch and throttle control device position sensor 152 similar to the sensor 16 described above. In other words, the sensor 152 provides a throttle control device position signal and a separate idle validation signal which indicates or verifies the throttle condition or idle condition of the throttle control device. In FIG. 7, the sensor 152 includes a screened film element 154. Screened film element 154 carries, in implementation of the idle validation switch, conductive portions 162 and 164 which lie generally along a common Wiper path, but are separated by a nonconductive portion 165. Lying parallel to the path of conductive portions 162 and 164, a conductive portion 166 carries a supply voltage potential.

A rotor 158 moves relative to the screened film element 154 and includes a bridge wiper element 159 with separate but conductively coupled legs 159*a* and 159*b*. The wiper element 159 thereby conductively bridges selected portions of the screened film element according to movement of rotor 158 movement. Wiper element 159 conductively bridges the portion 166 and one of the conductive portions 162 and 164 to implement an idle validation switch reactive to movement of the rotor 158. More particularity, wiper leg 159*a* remains in contact continuously with the conductive portion 166 and thereby carries the supply voltage potential. Wiper leg 159*b* engages one of the conductive portion 162, the nonconductive portion 165, or the conductive portion 164 according to the rotor 158 position.

As the rotor 158 moves from an idle position through a full throttle position the wiper element 159 delivers the supply voltage into the conductive portion 164 during an idle condition, delivers nothing across the nonconductive portion 165 during a transition between idle and throttle active conditions, and delivers the supply voltage into the conductive portion 162 during a throttle active condition. The potential at conductive portion 164 may be delivered by way of a multi-conductor cable to an engine control system. The engine control system then interprets a supply voltage potential at conductive portion 164 as an independent validation of an idle condition. Similarly, a supply voltage at the conductive portion 162 independently verifies a throttle active condition.

Sensor 152 provides a throttle position signal representative of the position of the rotor 158 relative to the screened film element 154, i.e. representative of the position of an associated throttle control device driving the rotor 158. In implementation of the throttle position signal, the sensor 152 includes a resistive element 168 having at one end 168*a* a connection to ground potential and at the opposite end 168*b* a connection to a supply voltage potential. A bridge wiper element 169, carried by the rotor 158, includes a first leg 169*a* in electrical contact with a conductive portion 170 of screened film element 154. A second leg 169*b* of the wiper element 169 remains in electrical contact with the resistive element 168 providing a voltage divide function whereby the voltage potential at the legs of wiper element 169, and, therefore at the conductive portion 170, represents the position of the associated throttle control device.

Sensor 152 thereby provides a reliable throttle position signal and independently validates a variety of conditions relative to the throttle control device associated with the sensor 152.

The integrated sensor 176 shown in FIG. 8 is a dual throttle control device position sensor. The sensor 176 provides two output signals, each representative of a throttle control device position along a given throttle control device range of movement. In this manner, one of the throttle control device position signals may be used to validate the other throttle control device signal, e.g., as by comparing the voltage potential of each signal. Alternatively, the two throttle control device position signals provided by the sensor 176 may be used in a twin engine application to deliver identical throttle control position signals to separate engine systems.

In FIG. 8, the sensor 176 includes a screened film element 180 and a rotor 178 which moves relative to the screened film element 180 according to movement of the associated throttle control device. The screened film element 180 includes a first resistive element 182 having at one end 182*a* an electrical connection to a ground potential and at the opposite end 182*b* and electrical connection to a supply potential. A conductive portion 184 lies adjacent and parallel to the resistive element 182. Bridge wiper element 183 includes a leg 183*a* in sliding electrical contact with the resistive element 182 and a second leg 183*b* in sliding electrical engagement with the conductive portion 184. The legs 183*a* and 183*b* are conductively coupled to bridge resistive element 182 and conductive portion 184. As the rotor 178 moves according to movement of the associated throttle control device, wiper 183 moves along the resistive element 182 and provides a voltage divide function representing throttle control device position according to potential at the bridge wiper 183. A throttle control device position signal is then taken from the conductive portion 184.

A similar arrangement is provided for the second throttle control device position signal. More particularly, a second resistive element 186 couples to a ground potential at its end 186*a* and to a supply voltage potential at its opposite end 186*b*. Bridge wiper element 187 includes a first leg 187*a* in electrical contact with the resistive element 186 and providing a voltage divide function according to the position of the rotor 178, i.e., according to the position of the associated throttle control device. A second leg 187*b* of the wiper 187, electrically coupled to the first leg 187*a*, electrically engages a conductive portion 188 lying adjacent and parallel to the resistive element 186. Thus, the potential at the conductive portion 188 may be taken as being representative of the associated throttle control device position.

FIG. 9 illustrates an integrated idle validation, transmission kick-down and throttle control device position sensor 198. In FIG. 9, sensor 198 includes a screened film element 202 carrying conductive portions 204 and 206 in alignment along a wiper leg path, but separated by a nonconductive portion 205. A conductive portion 208 lies parallel to the path of conductive portions 204 and 206. Bridge wiper 207 mounts to rotor 200 of the sensor 198 whereby wiper element 207 moves according to movement of the associated throttle control device. Conductive portion 208 carries a supply voltage potential. A first wiper leg 207*a* receives the supply voltage potential of conductive portion 208 and delivers this potential to the second leg 207*b*. As the rotor 200 moves from an idle condition through a full throttle condition, the wiper leg 207*b* contacts sequentially the conductive portion 206, the nonconductive portion 205, and finally the conductive portion 204.

An idle validation signal taken from the conductive portion 206 corresponds to a valid idle condition when the conductive portion 206 carries the supply voltage potential. A transmission kick-down signal taken from the conductive portion 204 represents a kick-down condition when the conductive portion 204 carries the supply voltage potential. A throttle position signal is taken from a conductive portion 212 of the screened film element 202 in a manner similar to that described above. More particularity, a resistive element 210 couples at its end 210*a* to a ground potential and its end 210*b* to a supply voltage potential. A bridge wiper 209 mounts to rotor 200. A first wiper leg 209*a* lies in sliding electrical contact with the conductive portion 212. A second leg 209*b* slidingly and electrically engages the resistive element 210. Thus, as the rotor 200 moves from an idle condition through a full throttle condition the leg 209*b* provides a voltage divide function and delivers a voltage potential to the conductive portion 212 corresponding to the position of the associated throttle control device.

FIGS. 7–9 illustrate the versatility of the present invention in providing accurate and independent throttle control position and position validation signals according to a desired pre-calibraton. In the illustrated embodiments, an integrated throttle position sensor and position validation sensor are provided within a common housing and react to a common mechanical input to provide suitable electrical outputs for delivery to an engine control system, e.g. a fuel delivery system or a transmission control system. In any case, the integrated throttle position and validation sensor of the present invention is useful where it is desirable to provide a throttle position signal and a separate, i.e. independent, indication of throttle control device position.

Thus, an integrated throttle position and position validation sensor has been shown and described. The integrated package reacts to accelerator pedal position by way of a single mechanical input and delivers suitable electrical signals as outputs to the electronic vehicle control system. The sensor enjoys protection from environmental conditions, i.e., the cab environment, by virtue of its integrated .packaging. Installation requires no calibration.

The integrated throttle position sensor with independent position validation sensor as illustrated herein avoids many costs associated with failure of prior throttle control with separate validation signal systems. More particularly, the validation and throttle position sensors as integrated and pre-calibrated at the time of manufacture within a signal housing requires only that the truck operator obtain a signal replacement part for a failed throttle control system and mount the part to the pedal assembly. The entire pedal assembly need not be replaced. Given the availability of overnight delivery services, the replacement part, i.e., as integrated within a common housing, can be obtained in short time. Thus, under such repair process the operator would only need sufficient time to obtain the replacement part, and no specially trained personnel would be required to service the truck. Because the throttle control system of the present invention provides physically integrated throttle position and throttle validation sensors, calibration therebetween is not required in the field. Accordingly, the repair process is less costly, greatly shortened and simple enough to be accomplished by the driver or an ordinary repair person.

It will be appreciated that the present invention is not restricted to the particular embodiment or application that has been described and illustrated and that many variations may be made therein without departing from the scope of the invention as found in the appended claims and the equivalents thereof. For example, while the invention has been shown for a foot operated accelerator pedal, it should be apparent that the invention may be applied to a variety of control devices where separate validation signals are desired. Also, while the present invention has been illustrated in the context of electronic fuel control systems it should be appreciated that the present invention may be applied to other motor control systems such as the control of an electrical motor. Generally, the present invention is applicable in any throttle control application where it is desirable to separately and independently validate a throttle position signal with a separate signal originating from the throttle control device and verifying or matching some fashion the throttle position signal. The validation signal can verify a host of throttle conditions, typically idle validation, but a great variety of configurations are possible in implementation of a selected validation function.

I claim:

1. An integrated throttle sensor system responsive to operator actuated movement of a throttle control device, said integrated throttle sensor system comprising:

a mounting arrangement for attachment of said throttle sensor system to said throttle control device;

a first throttle position sensor coupled to said mounting arrangement and responsive to movement of said throttle control device by providing a throttle position signal representing position of said throttle control device; and a second throttle position sensor coupled to said mounting arrangement, coupled to said first sensor at manufacture of said integrated throttle sensor system to establish at manufacture a predetermined registration between said first and second sensors, and responsive to movement of said throttle control device to provide a throttle validation signal calibrated at time of manufacture relative to said throttle position signal whereby said integrated throttle sensor system may be attached to said throttle control device and respond to movement of said throttle control device by producing said throttle position signal and said throttle validation signal according to said predetermined registration between said first and second sensors.

2. A system according to claim 1 further comprising a mechanical input in association with said mounting arrangement whereby upon attachment of said throttle sensor system to said throttle control device said mechanical input moves according to movement of said throttle control device, said first and second sensors being responsive to said throttle control device by response to said mechanical input.

3. A system according to claim 2 further comprising a common housing defining said mounting arrangement and containing said first and second sensors, said mechanical input operating through said housing, said throttle position and throttle validation signals being delivered through said housing.

4. A system according to claim 1 wherein said throttle position signal represents a throttle position along a first range of throttle control device movement and said throttle validation signal verifies throttle control device position as within or outside a second range of throttle control device movement.

5. A system according to claim 4 wherein said second range is a sub-range of said first range.

6. An integrated throttle sensor system responsive to operator actuated movement of a throttle control device, said integrated throttle sensor system comprising:

a mechanical input and associated mounting arrangement for attachment of said throttle sensor system to said throttle control device whereby said mechanical input moves according to said operator actuated movement of said throttle control device;

a first throttle position sensor responsive to said mechanical input and providing a throttle position signal representing position of said throttle control device; and a second throttle position sensor coupled to said first sensor at manufacture at said integrated throttle sensor system to establish at manufacture a predetermined registration between said first and second sensors, said second sensor responsive to said mechanical input to provide a throttle validation signal calibrated at manufacture relative to said throttle position signal whereby said throttle sensor system may be attached to said throttle control device and respond to movement of said throttle control device by producing independently but according to said predetermined registration said throttle position signal and said throttle validation signal.

7. A system according to claim 6 wherein said integrated throttle sensor system further comprising a common housing containing said first and second sensors, said mechanical input operating through said housing, said throttle position and throttle validation signals being delivered through said housing.

8. A system according to claim 6 wherein said throttle position signal represents a throttle position along a first range of throttle control device movement and said throttle validation signal verifies throttle control device position as within or outside a second range of throttle control device movement.

9. A system according to claim 8 wherein said second range is a sub-range of said first range.

10. An integrated throttle sensor responsive to movement of a throttle control device, the integrated throttle sensor system comprising:

a sensor housing including a mounting arrangement for attachment of said throttle sensor system to said throttle control device;

a mechanical input responsive to movement of said throttle control device when said housing is attached to said throttle control device, said mechanical input delivering within said housing a mechanical indication of throttle control device position;

first and second sensors within said housing and coupled at the time of manufacture of said throttle sensor system in such manner to establish at manufacture a predetermined registration between first and second throttle position signals produced by said first and second sensors, respectively, whereby said first and second position signals are produced independently and as a function of said mechanical indication of throttle control device position; and a signal delivery arrangement making available external of said housing said first and second throttle position signals whereby said throttle sensor system may be mounted to said throttle control device and provide said first and second throttle position signals independently but according to said predetermined registration.

11. A system according to claim 10 wherein said first throttle position signal represents a throttle position along a first range of throttle control device movement and said second throttle position signal is a position validation signal verifying throttle control device position as within or outside a second range of throttle control device movement.

12. A system according to claim 11 wherein said second range is a sub-range of said first range.

* * * * *